US007936139B2

(12) United States Patent
Keller, Jr.

(10) Patent No.: US 7,936,139 B2
(45) Date of Patent: May 3, 2011

(54) METHOD AND APPARATUS TO FACILITATE CONTROLLING THE CONNECTION OF A MAINS TO A MOVABLE BARRIER OPERATOR POWER SUPPLY

(75) Inventor: Robert R. Keller, Jr., Park Ridge, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 375 days.

(21) Appl. No.: 12/119,942

(22) Filed: May 13, 2008

(65) Prior Publication Data

US 2009/0284188 A1 Nov. 19, 2009

(51) Int. Cl.
*H02P 5/00* (2006.01)
*H02P 5/46* (2006.01)

(52) U.S. Cl. ......................... 318/105; 318/139; 318/466

(58) Field of Classification Search .................. 318/105, 318/139, 466
See application file for complete search history.

(56) References Cited

U.S. PATENT DOCUMENTS 7,161,320 B2 * 1/2007 Shimizu et al. ............... 318/461
2004/0227410 A1 11/2004 Fitzgibbon

* cited by examiner

*Primary Examiner* — Bentsu Ro
*Assistant Examiner* — Erick Glass
(74) *Attorney, Agent, or Firm* — Fitch Even Tabin & Flannery

(57) ABSTRACT

A movable barrier operator having control circuitry (206) to selectively cause movement of a corresponding movable barrier (203) and a power supply that is operably coupled to a mains (201) and is operably coupled to provide electrical motive power to components of the operator can be configurable to selectively disconnect a portion, but not all, of the power supply from the mains when full power availability for the components is not required. This power supply can comprise a less efficient first power supply (204) and a more efficient second power supply (205). In such a case, these teachings can provide for disconnecting (105) the first power supply from the mains when a higher level of power is not presently required. Meanwhile, the second power supply can continue to provide operating power to, for example, the aforementioned control circuitry to ensure ongoing functionality of the movable barrier operator.

19 Claims, 2 Drawing Sheets

100

METHOD AND APPARATUS TO FACILITATE CONTROLLING THE CONNECTION OF A MAINS TO A MOVABLE BARRIER OPERATOR POWER SUPPLY

TECHNICAL FIELD

This invention relates generally to movable barrier operators and more particularly to movable barrier operator-related power control.

BACKGROUND

Movable barrier operators of various kinds are known in the art and include, for example, so-called garage door openers. Movable barrier operators typically serve to facilitate the automated movement of one or more corresponding movable barriers (such as, but not limited to, single panel and segmented garage doors, rolling shutters, pivoting and sliding gates, arm guards, and so forth). In many cases such movable barrier operators are responsive to a remotely sourced control signal (or signals) to institute such activity.

Moment-to-moment power supply needs of a typical movable barrier operator can vary considerably. A typical movable barrier operator, on the one hand, is "on" essentially all the time as an instruction from an end user to effective desired movement of the corresponding movable barrier can arrive at any time. On the other hand, the power supply requirements of such an operator are usually greatest when the movable barrier operator expends energy to cause barrier movement.

Unfortunately, the power supplies for movable barrier operators must be configured to support these occasional high power requirements. As a result, these power supplies typically comprise a transformer and this transformer usually represents a source of considerable inefficiency. For example, many such transformers have a core formed of iron laminations and these iron laminations give rise, in turn, to eddy currents that represent a considerable amount of wasted electrical energy. As a result, the stand-by electrical requirements of such a movable barrier operator comprises, in some significant amount, wasted electrical power.

BRIEF DESCRIPTION OF THE DRAWINGS

The above concerns are at least partially met through provision of the method and apparatus to facilitate controlling the connection of a mains to a movable barrier operator power supply described in the following detailed description, particularly when studied in conjunction with the drawings, wherein.

Figure 1:
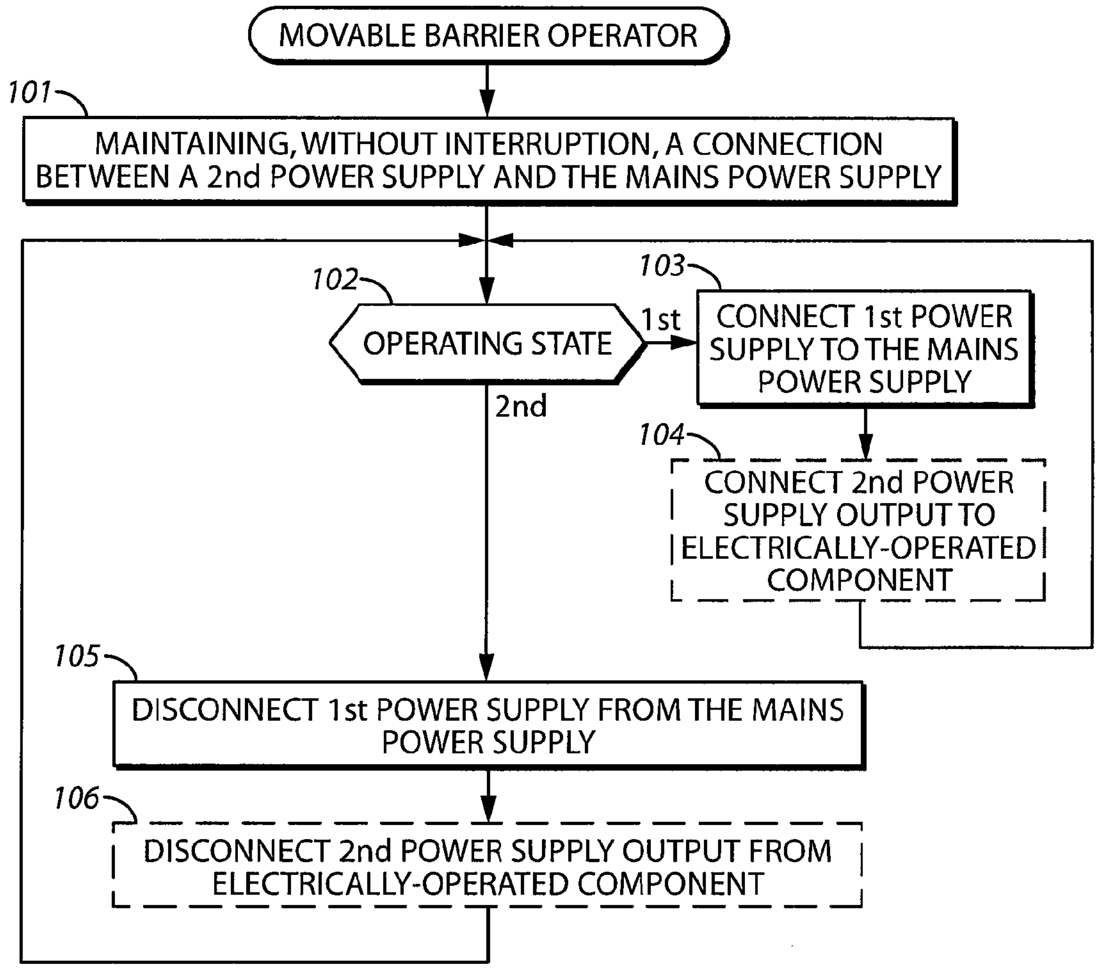
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a movable barrier operator having control circuitry to selectively cause movement of a corresponding movable barrier between opened and closed positions and a power supply that is operably coupled to a mains and operably coupled to provide electrical motive power to components of the movable barrier operator can be configurable to selectively disconnect a portion, but not all, of the power supply from the mains when full power availability for the components is not required. (As used herein, the expression "configurable" will be understood to refer to a purposeful and specifically designed and intended state of configurability and is not intended to include the more general notion of something being forcibly capable of assuming some alternative or secondary purpose or function through a subsequent repurposing of a given enabling platform.)

By one approach, this power supply can comprise a first power supply (which may comprise a relatively inefficient power supply having, for example, a transformer) and a second power supply (which may comprise a relatively efficient power supply such as a switched mode power supply). In such a case, these teachings can provide for disconnecting the first power supply from the mains when a higher level of power is not presently required. Meanwhile, the second power supply can continue to provide operating power to, for example, the aforementioned control circuitry to ensure ongoing functionality of the movable barrier operator.

By one approach, the movable barrier operator can comprise additional circuitry that does not necessarily require constant energization. In such a case, these teachings will also accommodate configuring the movable barrier operator to discontinue the provision of power to such additional circuitry on a selective basis notwithstanding that the second power supply remains connected to the mains and notwithstanding that the second power supply is still providing power to, for example, the control circuitry.

Those skilled in the art will recognize and appreciate that these teachings provide a mechanism to permit using a lower efficiency power supply as may be usefully employed by the movable barrier operator during times when high power requirements exist while disconnecting that lower efficiency power supply from the mains to thereby reduce its standby power requirements to zero during other times. This, in turn, can result in significant energy savings. It will be further understood and appreciated that these teachings are quite flexible and can be readily scaled as well to accommodate a wide variety of application settings. This can comprise, for example, accommodating the complete powering down of a variety of other components (such as, for example, obstacle detection sensors, breaking-spring sensors, and so forth) as well during stand-by states.

Figure 2:
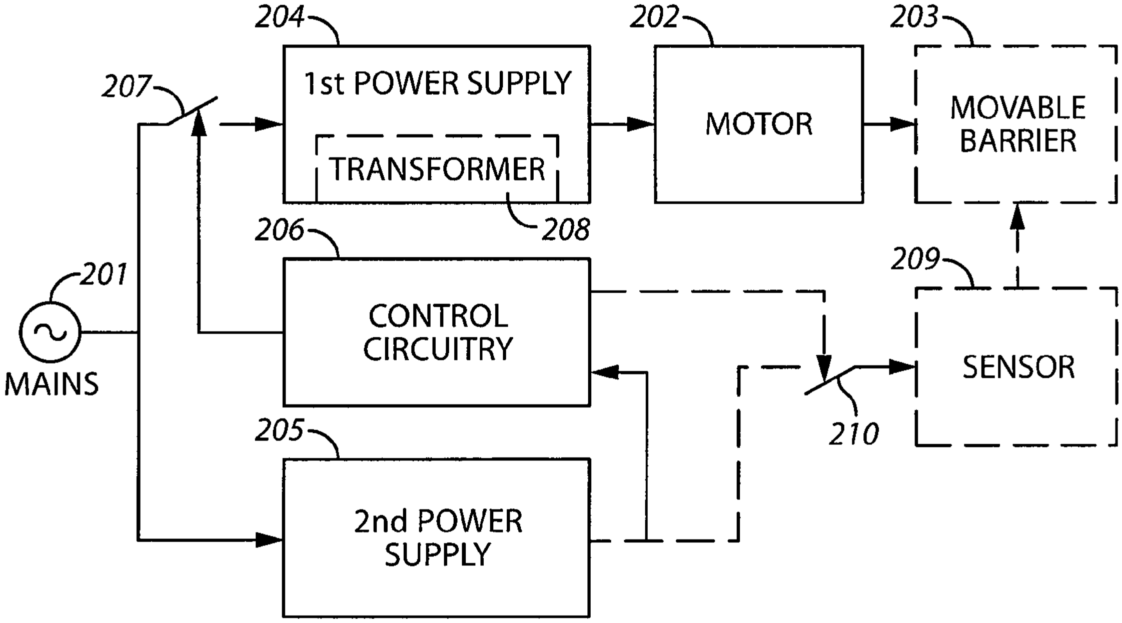
FIG. 2 comprises a block diagram as configured in accordance with various embodiments of the invention.

These and other benefits may become clearer upon making a thorough review and study of the following detailed description. Referring now to the drawings, FIG. 1 depicts an illustrative process that is compatible with many of these teachings while FIG. 2 depicts an illustrative approach to a platform that will support such a process.

As noted, the illustrated process 100 can be carried out by a corresponding movable barrier operator. Generally speaking, this movable barrier operator has a mains interface and receives its operating power from a corresponding mains 201. (The expression "mains" will be understood to refer to a supply of general purpose alternating current (AC) electrical power. Other common expressions for a same supply are household power, household electricity, domestic power, wall power, line power, AC power, city power, and grid power.) This mains interface will be understood to refer to a connection that neither introduces nor imposes any significant change with respect to incoming voltage, current, or waveform of the mains output.

This power is ultimately used, in part, to power a motor 201 that provides, in turn, the motive power that serves to selectively move a corresponding movable barrier 203 between, for example, opened and closed positions. (Movable barriers of various kinds are known in the art and include, for example, single panel and segmented garage doors, rolling shutters, pivoting and sliding gates, arm guards, and so forth.) Such components are themselves very well known in the art and require no further elaboration here.

In this illustrative example, the power supply for the movable barrier operator comprises a first power supply 204 and a second power supply 205. Generally speaking, the first power supply 204 provides enabling power to the aforementioned motor 202 while the second power supply 205 provides enabling power elsewhere (as described, for example, below in more detail). The illustrated process 100 serves, in part, to maintain 101, without interruption, a connection between that second power supply 205 and the mains 201 regardless of the operating state of the movable barrier operator. (Those skilled in the art will recognize and understand that this reference to maintaining such a connection "without interruption" refers to the ordinary operations and functionality of the movable barrier operator and is not intended to exclude, for example, an end user unplugging the movable barrier operator from the mains 201, a protective circuit element such as a fuse or circuit breaker opening this connection in response to some over-current condition, or the like.)

This, in turn, permits the second power supply 205 to continuously power such components as control circuitry 206 that is configured, for example, to selectively cause movement of the movable barrier 203 between the opened and closed positions. This control circuitry can also serve, in part and if so desired, to determine the operating state of the movable barrier operator. This can comprise, for example, determining if the present operating state is an open-the-movable-barrier operating state, a close-the-movable-barrier operating state, and so forth. These teachings will also well accommodate having this control circuitry 206 be configured (via, for example, corresponding programming as will be well understood by those skilled in the art) to carry out one or more of the steps as comprise the described process 100.

Such control circuitry can comprise a fixed-purpose hard-wired platform or can comprise a partially or wholly programmable platform. All of these architectural options, as well as numerous movable barrier operator control circuitry examples and options, are well known and understood in the art and require no further description here.

This process then provides for determining 102 the operating state of the movable operator (which may comprise determining a present operating state and/or determining an imminent and/or next subsequent operating state). When this operating state comprises a state that includes operating the motor 202 (which will be referred to herein as a first operating state), this process 100 then provides for connecting 103 the first power supply 204 to the mains 201. With reference to FIG. 2, this can be accomplished, by one approach, through use of a control circuitry-controlled switch 207 that is in-line between the first power supply 204 and the mains 201. This switch can be an electromagnetic type such as a relay or can be a solid state device, such as a silicon controlled rectifier (SCR), a triac, a transistor, or any other solid state device capable of serving as a switching element.

When this process 100 determines 102 instead that the operating state is one that does not require use of the motor 202 (which is referred to herein as a second operating state), this process 100 instead provides for disconnecting 105 the first power supply from the mains 201. This, again, can be readily effected if desired via opening of the aforementioned in-line switch 207 by the control circuitry 206.

So configured, the first power supply 204 comprises a portion of the movable barrier operator's power supply that can be selectively disconnected from the mains 201. In this illustrative example, this first power supply 204 provides power to the motor 202 and hence will typically comprise, at least in part, a transformer 208 (such as, but not limited to, a transformer having a transformer core that is comprised of laminated components that are prone to significant eddy current losses). By selectively shutting off the supply of power to this first power supply 204, significant stand-by energy savings can be anticipated given most typical application setting duty cycles. At the same time, as noted, this process 100 provides for continuously providing the second power supply 205 with a connection to the mains 201. This, in turn, assures that the control circuitry 206 remains operational and hence able to respond quickly and accurately to changing operational requirements and states.

If desired, these teachings will also accommodate controlling the connection of the output of the second power supply 205 to one or more other components notwithstanding this persistent connection between this second power supply 205 and the mains 201. This other component might comprise, for example, a sensor 209 as illustrated (such as, for example, an obstacle detection sensor as is known in the art), a sensor signal processing circuit, or even the aforementioned control circuitry 206.

Towards this end, the aforementioned process 100 can optionally accommodate, when the detected 102 operating state comprises the first operating state (meaning, in this illustrative example, that the movable barrier operator is, or will soon be, moving the movable barrier 203 via use of the motor 202), selectively connecting 104 an output of the second power supply 205 with respect to a first electrically-operated component of the movable barrier operator. This can be accomplished, for example, by use of an in-line switch 210 that is again, in this example, controlled by the control circuitry 206.

Similarly, when this process 100 detects 102 the second operating state, this process 100 can optionally provide for disconnecting 106 this second power supply output from the electrically-operated component. And again, in this illustrative example, the aforementioned switch 210 will serve to achieve this point of control.

So configured, other electrically-powered components comprising the movable barrier operator can be similarly powered down during periods of time when such a state can be tolerated. This, in turn, can lead to additional considerable stand-by energy savings without compromising the efficacy and functionality of the movable barrier operator.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A movable barrier operator configured to selectively move a movable barrier, the movable barrier operator comprising:

control circuitry configured to selectively cause movement of the movable barrier between opened and closed positions;

a first power supply device and a second power supply device operably coupled in parallel to a mains to receive power from the mains and being configured to condition the power from the mains for use by at least one component of the movable barrier operator;

wherein the movable barrier operator is further configured to selectively disconnect the first power supply device from the mains when full power availability for at least one component associated with the first power supply device is not required.

2. The movable barrier operator of claim 1 wherein the at least one component associated with the first power supply device comprises a motor that is responsive to the control circuitry to effect the movement of the movable barrier between opened and closed positions; and wherein the first power supply device provides operating power to the motor.

3. The movable barrier operator of claim 1 wherein the second power supply device is configured to receive electric power from the mains without interruption when the movable barrier operator is connected to the mains.

4. The movable barrier operator of claim 3 further comprising:

a first circuit; and wherein the second power supply device is configured to provide operating power to the first circuit regardless of whether the first power supply device is selectively disconnected from the mains.

5. The movable barrier operator of claim 4 wherein the first circuit comprises at least one of:

a portion of the control circuitry;

all of the control circuitry;

a sensor;

a sensor signal processing circuit.

6. The movable barrier operator of claim 4 wherein the second power supply device comprises a switched mode power supply.

7. A movable barrier operator of configured to selectively move a movable barrier, the movable barrier operator comprising:

control circuitry configured to selectively cause movement of the movable barrier between opened and closed positions;

a power supply operably coupled to a mains and operably coupled to provide electrical motive power to components of the movable barrier operator;

wherein the movable barrier operator is further configured to selectively disconnect a portion, but not all, of the power supply from the mains when full power availability for the components is not required;

wherein the power supply comprises:

a first power supply;

a second power supply;

wherein the second power supply is configured to receive electric power from the mains without interruption when the movable barrier operator is connected to the mains;

a first circuit;

wherein the second power supply is configured to provide operating power to the first circuit regardless of whether the portion of the power supply is selectively disconnected from the mains;

a second circuit; and wherein the movable barrier operator is further configured to selectively disconnect an output of the second power supply to discontinue a provision of power to the second circuit notwithstanding that the second power supply is still connected to the mains and notwithstanding that the second power supply is still providing the power to the first circuit.

8. A movable barrier operator having a mains interface, the movable barrier operator comprising:

a motor;

control logic operably coupled to selectively control the motor;

a first power supply device operably coupled to receive electrical power from the mains interface and being configured to condition the electrical power from the mains for use by the motor, the first power supply device being responsive to the control logic such that the first power supply device is selectively disconnectable from the mains interface;

a second power supply device operably coupled to receive electrical power from the mains interface and being configured to condition the electrical power from the mains for use by the control logic, wherein the second power supply device is not selectively disconnectable from the mains interface.

9. The movable barrier operator of claim 8 wherein the motor comprises a direct current (DC) motor.

10. The movable barrier operator of claim 8 wherein the first power supply device comprises, at least in part, a transformer.

11. The movable barrier operator of claim 10 wherein the transformer comprises a transformer core comprised of laminated components.

12. The movable barrier operator of claim 8 wherein the second power supply device comprises a switched mode power supply.

13. A method comprising:

at a movable barrier operator, automatically:

selectively connecting and disconnecting a first power supply device with respect to a mains as a function of at least one operating state of the movable barrier operator, the first power supply device being configured to receive power from the mains and condition the power from the mains for use by at least one component of the movable barrier operator;

maintaining, without interruption, a connection between a second power supply device and the mains regardless of the operating state of the movable barrier operator, the second power supply device being configured to receive power from the mains and condition the power from the mains for use by at least one component of the movable barrier operator.

14. The method of claim 13 wherein the first power supply device provides power to a motor.

15. The method of claim 14 wherein the second power supply device provides power to control circuitry that determines the operating state of the movable barrier operator.

16. A method comprising:

at a movable barrier operator, automatically:

selectively connecting and disconnecting a first power supply with respect to a mains as a function of at least one operating state of the movable barrier operator;

maintaining, without interruption, a connection between a second power supply and the mains regardless of the operating state of the movable barrier operator;

wherein the first power supply provides power to a motor;

wherein the second power supply provides power to control circuitry that determines the operating state of the movable barrier operator;

selectively connecting and disconnecting an output of the second power supply with respect to at least a first electrically-operated component of the movable barrier operator as a function of at least one operating state of the movable barrier operator.

17. A movable barrier operator configured to selectively move a movable barrier, the movable barrier operator comprising:

a motor;

control circuitry configured to selectively cause movement of the movable barrier between open and closed positions via operation of the motor;

a first power supply configured to operably couple to a mains and operably coupled to provide electrical power to the motor, the control circuitry being configured to selectively disconnect the first power supply from the mains when full power availability of the motor is not required;

an electrically-powered component;

a second power supply configured to operably couple to the mains and operably coupled to provide power to the control circuitry and the electrically-powered component, wherein the control circuitry is further configured to selectively disconnect an output of the second power supply to discontinue a provision of power to the electrically-powered component notwithstanding that the second power supply is still connected to the mains.

18. The movable barrier operator of claim 17 further comprising a switch in-line between the first power supply and the mains, the switch being operably coupled with the control circuitry and responsive to the control circuitry such that the control circuitry operates the switch to selectively disconnect the first power supply from the mains.

19. A method of operating a movable barrier operator having a first power supply configured to provide power to a motor and a second power supply configured to provide power to control circuitry that determines the operating state of the movable barrier operator, the method comprising:

selectively connecting and disconnecting the first power supply with respect to a mains as a function of at least one operating state of the movable barrier operator;

maintaining, without interruption, a connection between the second power supply and the mains regardless of the operating state of the movable barrier operator; and selectively connecting and disconnecting an output of the second power supply with respect to an electrically-operated component of the movable barrier operator as a function of at least one operating state of the movable barrier operator.

* * * * *

UNITED STATES PATENT AND TRADEMARK OFFICE

CERTIFICATE OF CORRECTION

PATENT NO. : 7,936,139 B2
APPLICATION NO. : 12/119942
DATED : May 3, 2011
INVENTOR(S) : Robert R. Keller, Jr.

It is certified that error appears in the above-identified patent and that said Letters Patent is hereby corrected as shown below:

IN THE CLAIMS:

Column 5, Claim 7, Line 48: After "operator" delete "of".

Signed and Sealed this
Nineteenth Day of July, 2011

David J. Kappos

David J. Kappos
*Director of the United States Patent and Trademark Office*